United States Patent [19]

Kimura et al.

[11] Patent Number: 5,342,868
[45] Date of Patent: Aug. 30, 1994

[54] CRYSTALLINE SYNTHETIC RESIN COMPOSITION

[75] Inventors: Ryoji Kimura; Tetuo Tuboi; Kazunori Nishikawa, all of Saitama, Japan

[73] Assignee: Asahi Denka Kogyo Kabushiki Kaisha, Tokyo, Japan

[21] Appl. No.: 26,479

[22] Filed: Mar. 4, 1993

[51] Int. Cl.⁵ .............................................. C08K 5/15
[52] U.S. Cl. .................... 524/108; 524/117; 524/356; 524/357; 524/361; 524/394; 524/396; 524/399; 524/570; 524/579; 524/599; 524/609; 524/612
[58] Field of Search ............... 524/117, 108, 356, 357, 524/361, 394, 396, 399, 570, 579, 599, 609, 612

[56] References Cited

U.S. PATENT DOCUMENTS

| | | | |
|---|---|---|---|
| 4,463,113 | 7/1984 | Nakahara et al. | 524/117 |
| 4,820,772 | 4/1989 | Goto et al. | 524/117 X |
| 4,885,326 | 12/1989 | Haruna et al. | 524/108 X |
| 5,034,441 | 7/1991 | Nakano et al. | 524/117 |

FOREIGN PATENT DOCUMENTS

| | | |
|---|---|---|
| 0446358 | 9/1991 | European Pat. Off. . |
| 58-1736 | 1/1983 | Japan . |
| 59-184252 | 10/1984 | Japan . |
| 63-69853 | 3/1988 | Japan . |
| 1-104638 | 4/1989 | Japan . |
| 1-104639 | 4/1989 | Japan . |
| 1-104647 | 4/1989 | Japan . |
| 1-129050 | 5/1989 | Japan . |
| 1-129051 | 5/1989 | Japan . |
| 3-43437 | 2/1991 | Japan . |
| 3-79649 | 4/1991 | Japan . |
| 3-81368 | 4/1991 | Japan . |
| 5-140466 | 6/1993 | Japan . |

*Primary Examiner*—Judy M. Reddick
*Attorney, Agent, or Firm*—Young & Thompson

[57] ABSTRACT

The crystalline synthetic resin composition of the present invention comprises 100 parts by weight of a crystalline synthetic resin compounded with (a) 0.01 to 5 parts by weight of at least one of alkali-metal carboxylates, alkali metal β-diketonates and alkali metal salts of β-ketoacetic esters and (b) 0.01 to 5 parts by weight of at least one of basic polyvalent metal salts of cyclic organophosphoric esters of the following general formula (I):

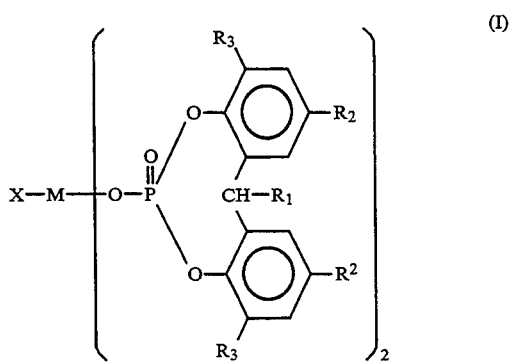

wherein $R_1$ represents a hydrogen atom or an alkyl group having 1 to 4 carbon atoms, $R_2$ and $R_3$ each represent a hydrogen atom or an alkyl group having 1 to 12 carbon atoms, M represents a group III or IV metal atom of the periodic table, and X represents HO— when M represents a group III metal atom of the periodic table and X represents O= or (HO)₂— when M represents a group IV metal atom of the periodic table. The compositions can be used for packaging materials, and coated molded articles.

8 Claims, No Drawings

CRYSTALLINE SYNTHETIC RESIN COMPOSITION

BACKGROUND OF THE INVENTION

1. Field of the Invention

The present invention relates to a crystalline synthetic resin composition, in particular, a crystalline synthetic resin composition comprising a synthetic resin compounded with an alkali metal compound and a basic polyvalent metal salt of a cyclic organophosphoric ester and having improved transparency, mechanical properties, etc.

1. Description of the Prior Art

Crystalline synthetic resins such as polyethylene, polypropylene, polybutene-1, polyethylene terephthalate, polybutylene terephthalate, polyphenylene sulfide and polyamide suffer from the fact that their mold cycling efficiency is low due to a low crystallization rate after heat melt molding and that they shrink due to the crystallization which proceeds after the heat molding. Other defects of these crystalline synthetic resins include an insufficient strength and a poor transparency due to the formation of large crystals.

It is known that all of these defects are due to the crystallinity of the synthetic resins and that the defects can be overcome by elevating the crystallization temperature of the synthetic resins so that fine crystals can be rapidly formed.

It is known to add a nucleating agent or a crystallization accelerator in order to overcome these defects, and those used heretofore include metal salts of carboxylic acids, such as aluminum 4-tert-butylbenzoate and sodium adipate; metal salts of acidic phosphoric esters, such as sodium bis(4-tert-butylphenyl) phosphate and sodium 2,2'-methylenebis(4,6-di-tert-butylphenyl) phosphate; and polyhydric alcohol derivatives such as dibenzylidenesorbitol and bis(4-methylbenzylidene)-sorbitol.

Among these compounds, metal salts of cyclic phosphoric esters of alkylidenebisphenols described in, for example, Japanese Patent Laid-Open Nos. 1736/1983 and 184252/1984 have remarkable effects and, therefore, they are widely used.

It has also been attempted to improve the effects of these compounds by combining them with other metal compounds. For example, Japanese Patent Laid-Open No. 69853/1988 discloses a method of preventing the rigidity from being reduced when an alkali metal aromatic phosphate nucleating agent is used in combination with an alkaline earth metal carboxylate such as calcium stearate by using hydrotalcite or an alkali metal carboxylate in place of the alkaline earth metal carboxylate; Japanese Patent Laid-Open Nos. 129050/1989 and 129051/1989 disclose a method wherein a combination of a metal salt of a cyclic organophosphoric ester with a salt of an aliphatic carboxylic acid with a group II metal of the periodic table is used; Japanese Patent Laid-Open Nos. 79649/1991 and 81368/1991 disclose a method wherein a combination of an acidic organophosphoric ester compound with a metal salt of an aliphatic carboxylic acid is used; and Japanese Patent Laid-Open No. 43437/1991 discloses a method of preventing the pH from lowering by immersion of a metal salt of a cyclic organophosphoric ester in hot water after irradiation with a radiation by combining it with a hydroxide of an alkali metal, alkaline earth metal or aluminum-group metal.

However, the effects obtained even by the abovedescribed combinations are yet unsatisfactory in practice, and a further improvement has been demanded particularly in the transparency of the crystalline synthetic resins.

Although Japanese Patent Laid-Open Nos. 104638/1989, 104639/1989 and 104647/1989 disclose the use of a basic aluminum salt of an aromatic phosphoric diester in order to improve the processability and thermal rigidity of a high-rigidity propylene resin, scarcely any effect of improving the transparency is obtained by using such a compound. It has been supposed that such a basic polyvalent metal salt compound has only a poor effect of improving the transparency of the crystalline synthetic resins.

SUMMARY OF THE INVENTION

After intensive investigations made under these circumstances, the inventors have found that the transparency of the crystalline synthetic resins can be remarkably improved and, in addition, mechanical strengths thereof can also be improved by adding an alkali metal carboxylate, alkali metal $\beta$-diketonate or alkali metal salt of $\beta$-ketoacetic ester or basic polyvalent metal salt of cyclic organophosphoric ester to the resin. The present invention has been completed on the basis of this finding.

Namely, the present invention provides a crystaline synthetic resin composition comprising 100 parts by weight of a crystalline synthetic resin compounded with (a) 0.01 to 5 parts by weight of at least one of alkali metal carboxylates, alkali metal $\beta$-diketonates and alkali metal salts of $\beta$-ketoacetic esters and (b) 0.01 to 5 parts by weight of at least one of basic polyvalent metal salts of cyclic organophosphoric esters of the following general formula (I):

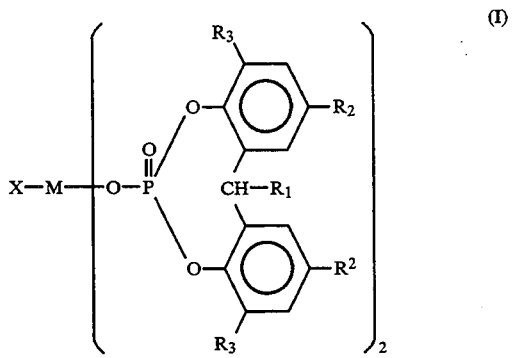

wherein $R_1$ represents a hydrogen atom or an alkyl group having 1 to 4 carbon atoms, $R_2$ and $R_3$ each represent a hydrogen atom or an alkyl group having 1 to 12 carbon atoms, M represents a group III or IV metal atom of the periodic table, and X represents HO—when M represents a group III metal atom of the periodic table and X represents O = or (HO)$_2$−when M represents a group IV metal atom of the periodic table.

The crystalline synthetic resin composition of the present invention is improved in transparency and also in other properties such as mechanical strengths.

DETAILED DESCRIPTION OF THE INVENTION

The alkali metals constituting the alkali metal salt compounds (a) such as alkali metal carboxylates, alkali metal β-diketonates and alkali metal salts of β-ketoacetic esters include lithium, sodium and potassium.

The carboxylic acids constituting the alkali metal carboxylates include aliphatic monocarboxylic acids such as acetic, propionic, acrylic, octylic, isooctylic, nonanoic, decanoic, lauric, myristic, palmitic, stearic, oleic, ricinoleic, 12-hydroxystearic, behenic, montanic, melissic, β-dodecylmercaptoacetic, β-dodecylmercaptopropionic, β-N-laurylaminopropionic and β-N-methyl-N-lauroylaminopropionic acids; aliphatic polycarboxylic acids such as malonic, succinic, adipic, maleic, azelaic, sebacic, dodecanedioic, citric, butanetricarboxylic and butanetetracarboxylic acids; allcyclic mono- and polycarboxylic acids such as naphthenic, cyclopentanecarboxylic, 1-methylcyclopentanecarboxylic, 2-methylcyclopentanecarboxylic, cyclopentenecarboxylic, cyclohexanecarboxylic, 1-methylcyclohexanecarboxylic, 4-methylcyclohexanecarboxylic, 3,5-dimethylcyclohexanecarboxylic, 4-butylcyclohexanecarboxylic, 4-octylcyclohexanecarboxylic, cyclohexenecarboxylic, and 4-cyclohexene-1,2-dicarboxylic acids; and aromatic mono- and polycarboxylic acids such as benzoic, toluic, xylylic, ethylbenzoic, 4-tert-butylbenzoic, salicylic, phthalic, trimellitic and pyromellitic acids.

The β-diketone compounds constituting the abovedescribed alkali metal β-diketonates include acetylacetone, pivaloylacetone, palmitoylacetone, benzoylacetone, pivaloylbenzoylacetone and dibenzoylmethane.

The β-diketoacetic esters constituting the above-described alkali metal salts of β-ketoacetic esters include ethyl acetoacetate, octyl acetoacetate, lauryl acetoacetate, stearyl acetoacetate, ethyl benzoylacetate and lauryl benzoylacetate.

The above-described alkali metal carboxylates, alkali metal β-diketonates and alkali metal salts of β-ketoacetic esters used as the component (a) are salts of the above-described alkali metals with carboxylic acids, β-diketone compounds and β-ketoacetic esters, respectively. They can be produced by any method known in the art. Among the alkali metal salt compounds (a), preferred are alkali metal salts of aliphatic monocarboxylic acids, still preferably lithium salts of aliphatic carboxylic acids, particularly aliphatic monocarboxylic acids each having 8 to 20 carbon atoms.

The amount of the alkali metal carboxylate, alkali metal β-diketonate or alkali metal salt of β-ketoacetic ester to be used as the component (a) is 0.01 to 5 parts by weight, particularly preferably 0.05 to 3 parts by weight, for 100 parts by weight of the crystalline synthetic resin.

In the above-described basic polyvalent metal salts of cyclic organophosphoric esters of the general formula (I), used as the component (b) of the crystalline synthetic resin composition of the present invention, the alkyl group $R_1$ having 1 to 4 carbon atoms includes methyl, ethyl, propyl, isopropyl, butyl, sec-butyl and isobutyl, and the alkyl groups $R_2$ and $R_3$ having 1 to 12 carbon atoms includes methyl, ethyl, propyl, isopropyl, butyl, sec-butyl, tert-butyl, amyl, tert-amyl, hexyl, heptyl, octyl, isooctyl, tert-octyl, 2-ethylhexyl, nonyl, isononyl, decyl, isodecyl, undecyl, dodecyl and tert-dodecyl.

The group III and IV metal atoms, M, of the periodic table include aluminum, gallium, germanium, tin, titanium and zirconium, among which aluminum is particularly preferred.

Therefore, examples of the basic polyvalent metal salts of cyclic organophosphoric esters of the general formula (I) include the following compounds (compound No. 1 to compound No. 6):

compound No. 1

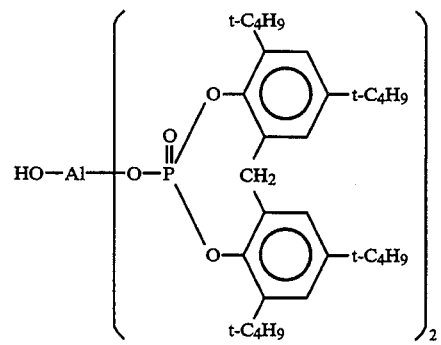

compound No. 2

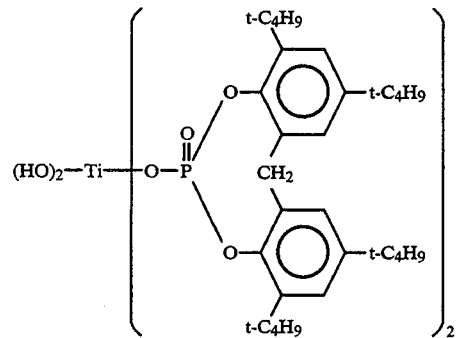

compound No. 3

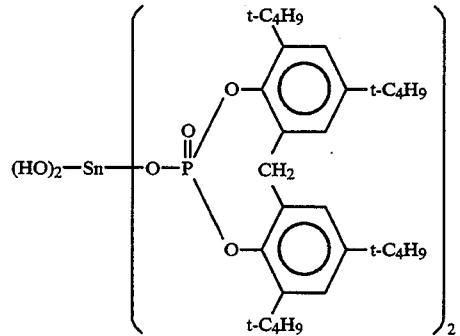

compound No. 4

-continued
No. 1 to compound No. 6):

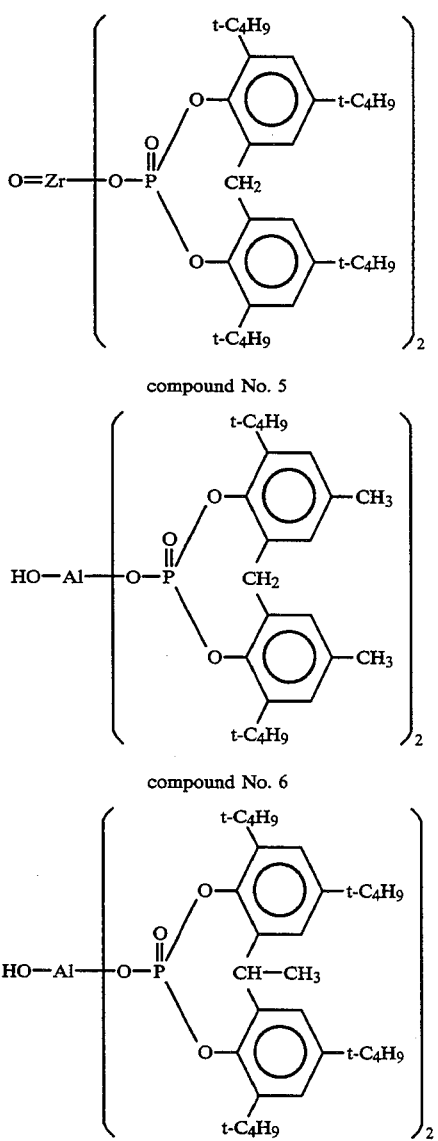

compound No. 5 compound No. 6

The basic polyvalent metal salts of cyclic organophosphoric esters can be easily produced by, for example, a process which comprises reacting an alkali metal salt of an acidic cyclic organophosphoric ester with a polyvalent metal halide or oxidized polyvalent metal halide and, if necessary, hydrolyzing the reaction product, or a process which comprises reacting an acidic cyclic organophosphoric ester with a polyvalent metal alkoxide and, if necessary, hydrolyzing the reaction product.

The following Preparation Example 1 to Preparation Example 4 will illustrate the preparation of the above-described basic polyvalent metal salts of cyclic organophosphoric esters to be used in the present invention, which by no means limit the invention.

PREPARATION EXAMPLE 1

Preparation of Compound No. 1

10.16 g (0.02 mol) of sodium 2,2'-methylenebis-(4,6-di-tert-butylphenyl) phosphate was dissolved in methanol and 50 ml of an aqueous solution of 2.41 g (0.01 mol) of aluminum trichloride hexahydrate was added dropwise to the resulting solution under stirring at 40° C. for a period of 30 min. After the completion of the addition, the reaction mixture was stirred under reflux of methanol for 4 h, cooled to room temperature, and adjusted to pH 6 with a 3 N aqueous sodium hydroxide solution. The product was filtered, washed with water, and dried to give 9.63 g of a white powder having a melting point of 300° C. or above.

The results of the analysis of the obtained white powder (product) were as follows, which proved that the product was the intended one:

aluminum content: 2.75% (calculated: 2.66%),
phosphorus content: 6.20% (calculated: 6.11%),
infrared spectroscopy: 3400 cm$^{-1}$ ($v_{OH}$), 1470 cm$^{-1}$ ($v_{p=0}$), 1230 cm$^{-1}$, 1100 cm$^{-1}$, and 940 cm$^{-1}$ ($v_{p-0}$).

PREPARATION EXAMPLE 2

Preparation of Compound No. 2

9.36 g (0.02 tool) of 2,2'-methylenebis(4,6-di-tert-butylphenyl) acid phosphate was dissolved in toluene and a solution of 2.84 g (0.01 mol) of tetraisopropyl titanate in toluene was added to the resulting solution. After stirring at 80° C. for 2 h, 2 g of water was added to the mixture, and the resultant mixture was stirred at 80° C. for additional 2 h. After cooling to room temperature, the product was filtered and dried to give 9.68 g of a white powder having a melting point of 300° C. or above.

The results of the analysis of the obtained white powder ( product ) were as follows, which proved that the product was the intended one:

titanium content: 4.58% (calculated: 4.55%),
phosphorus content: 6.03% (calculated: 5.89%),
infrared spectroscopy (cm$^{-1}$) 3400 cm$^{-1}$ ($v_{OH}$), 1470 cm$^{-1}$ ($v_{p=0}$), 1260 cm$^{-1}$, 1100 cm$^{-1}$ and 920 cm$^{-1}$ ($v_{p-0}$).

PREPARATION EXAMPLE 3

Preparation of Compound No. 3

10.16 g (0.02 mol) of sodium 2,2'-methylenebis-(4,6-di-tert-butylphenyl) phosphate was dissolved in methanol and 50 ml of an aqueous solution of 4.04 (0.01 mol) of tin tetrachloride octahydrate was added dropwise to the resulting solution under stirring at 50° C. for a period of 30 min. After the completion of the addition, the reaction mixture was stirred under reflux of methanol for 4 h and cooled to room temperature. The product was filtered, washed with water, and dried to give 10.44 g of a white powder having a melting point of 300° C. or above.

The results of the analysis of the obtained white powder (product) were as follows, which proved that the product was the intended one:

tin content: 10.10% (calculated: 10.57%),
phosphorus content: 5.65% (calculated: 5.52%),
infrared spectroscopy: 3400 cm$^{-1}$ ($v_{OH}$), 1470 cm$^{-1}$ ($v_{p=0}$), 1220 cm$^{-1}$, 1060 cm$^{-1}$ and 950 cm$^{-1}$ ($v_{p-0}$).

PREPARATION EXAMPLE 4

Preparation of Compound No. 4

10.16 g (0.02 mol) of sodium 2,2'-methylenebis(4,6-di-tert-butylphenyl) phosphate was dissolved in methanol and 50 ml of an aqueous solution of 3.22 g (0.01 mol) of zirconium dichloride oxide octahydrate was added dropwise to the resulting solution under stirring at 50° C. for a period of 30 min. After the completion of the addition, the reaction mixture was stirred under reflux of methanol for 4 h and cooled to room temperature. The product was filtered, washed with water, and dried to give 10.12 g of a white powder having a melting point of 300° C. or above.

The results of the analysis of the obtained white powder (product) were as follows, which proved that the product was the intended one:

zirconium content: 8.56% (calculated: 8.47%),
phosphorus content: 5.70% (calculated: 5.76%),
infrared spectroscopy: 3400 cm$^{-1}$ ($v_{OH}$), 1470 cm$^{-1}$ ($v_{p=O}$), 1230 cm$^{-1}$, 1080 cm$^{-1}$ and 940 cm$^{-1}$ ($v_{p-O}$).

Also the particle diameter of the basic polyvalent metal salts of cyclic organophosphoric esters is not particularly limited, and for example, those having an average particle diameter of 0.01 to 50 μm are usable. For homogeneously dispersing the particles, however, it is preferred to pulverize them into fine particles having an average particle diameter of 10 μm or below, particularly 3 μm or below.

The amount of the basic polyvalent metal salts of cyclic organophosphoric esters is 0.01 to 5 parts by weight, preferably 0.03 to 3 parts by weight, for 100 parts by weight of the crystalline synthetic resin.

Although the ratio of the alkali metal salt compound (a) to the basic polyvalent metal salt of cyclic organophosphoric ester (b) is not particularly limited, the effect of the present invention becomes remarkable when the amount of the component (a) is at least equivalent to that of the component (b).

Examples of the crystalline synthetic resins in the present invention include α-olefinic polymers such as low-density polyethylene, linear low-density polyethylene, high-density polyethylene, polypropylene, polybutene-1, poly-3-methylbutene and ethylene/propylene block and random copolymers; thermoplastic linear polyesters such as polyethylene terephthalate, polybutylene terephthalate and polyhexamethylene terephthalate; polyphenylene sulfide; polycaprolactone; and linear polyamides such as polyhexamethyleneadipamide.

The present invention is extremely useful when a crystalline α-olefinic polymers, particularly polypropylene resins such as polypropylene, ethylene/ propylene copolymer and a mixture of such a propylene polymer with another α-olefinic polymer is used.

The present invention is applicable irrespective of the limiting viscosity, isotactic pentad fraction, density, molecular weight distribution, melt flow rate and rigidity of such a polypropylene resin. For example, the present invention is suitably applicable to also polypropylene resins described in Japanese Patent Laid-Open Nos. 37148/1988, 37152/1988, 90552/1988, 210152/1988, 213547/1988, 243150/1988, 243152/1988, 260943/1988, 260944/1988, 264650/1988, 178541/1989, 49047/1990, 102242/1990, 251548/1990, 279746/1990 and 195751/1991.

In the preparation of the crystalline synthetic resin composition of the present invention, the components can be added to the resin by any ordinary method such as a method which comprises dry-blending the crystalline synthetic resin powder or pellets with powdery additives, or a method which comprises preparing a master batch comprising the components in a high concentration and adding the master batch to the crystalline synthetic resin. The crystalline synthetic resin composition of the present invention can be used in the form of various moldings, fibers, biaxially oriented films and sheets formed by well-known molding methods such as extrusion molding, injection molding, vacuum molding, blow molding or crosslinking foaming molding.

The crystalline synthetic resin composition of the present invention can be used as a material which is to be after-treated by various methods such as one to be sterilized by irradiation for use in medical treatment or as packaging material for foods, or one to be treated with a low-temperature plasma for improving the surface properties such as coatability after the molding.

The resistance of the crystalline synthetic resin composition of the present invention to oxidation and light can be further improved, if necessary, by adding a phenolic antioxidant, an organophosphorus antioxidant such as an organophosphite or phosphonite, a thioether antioxidant; or a light stabilizer such as an infrared absorber or a hindered amine compound. Particularly, the coloration and deterioration of mechanical properties in the course of heat processing can be prevented by using a phenolic antioxidant and/or an organophosphorus antioxidant.

The phenolic antioxidants include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, thiodieyhylenebis[(3,5-di-tert-butyl-4-hydroxyphenyl) propionate], 4,4'-thiobis(6-tert-butyl-m-cresol), 2-octyl-thio4,6-di (3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]/-glycol ester, 4,4'-butylidenebis(6-tert-butyl-m-cresol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris (3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene 3-(3,5-di-tert-butyl-4-hydroxyphenyl) propionate]methane, 2-tert-butyl-4-methyl-6-(2-acryloyloxy-3-tert-butyl-5-methylbenzyl)-phenol, 3,9-bis[1,1-dimethyl-2-hydroxyethyl)-2,4,8,10-tetraoxaspiro [5,5]undecane-bis[β-(3-tert-butyl-4-hydroxy-5-butylphenyl)propionate] and triethylene glycol bis[β-(3-tert-butyl-4-hydroxy-5-methylphenyl)propionate.

The amount of the above-described phenolic antioxidant used is preferably 0.001 to 5 parts by weight, still preferably 0.01 to 3 parts by weight, for 100 parts by weight of the synthetic resin.

The organophosphorus antioxidants include trisnonylphenyl phosphite, tris(mono- and dinonylphenyl) phosphites, tris(2,4-di-tert-butylphenyl) phosphite, di(-tridecyl) pentaerythritol diphosphite, distearyl pentaerythritol diphosphite, bis(2,4-di-tert-butylphenyl) pentaerythritol diphosphite, bis(2,6-di-tert-butyl-4-methylphenyl) pentaerythritol diphosphite, bis(2,4,6-tri-tert-butylphenyl) pentaerythritol diphosphite tetra(tridecyl)isopropylidenediphenol diphosphite, tetra(tridecyl) 4,4'-n-butylidenebis(2-tert-butyl-5-methylphenol) diphosphite, hexa(tridecyl) 1,1,3-tris(3-tert-butyl-4-hydroxy-5-methylphenyl)butane triphosphite, 2,2'-methylenebis(4,6-di-tert-butylphenyl) octyl phosphite, 2,2'-methylenebis(4,6-di-tert-butylphenyl) octadecyl phosphite, 2,2'-methylenebis(4,6-di-tert-butylphenyl) fluorophosphite, tetrakis(2,4-di-tert-butylphenyl) biphenylenediphosphonite and 9,10-dihydro-9-oxa-10-phosphaphenanthrene 10-oxide.

The amount of the above-described organophosphorus antioxidant is preferably 0.001 to 5 parts by weight, still preferably 0.01 to 3 parts by weight, for 100 parts by weight of the crystalline synthetic resin.

The thioether antioxidants include dialkyl thiodipropionates such as dilauryl, dimyristyl, myristyl stearyl and distearyl thiodipropionates; and polyol β-alkylmercaptopropinates such as pentaerythritol tetra(β-dodecylmercaptopropionate).

The ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl) benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)5-chlorobenzotriazole, 2-(2-hydroxy-3-tert-butyl-5-methylphenyl)-5-chlorobenzotriazole, 2-(2-hydroxy-3,5-dicumylphenyl)-benzotriazole, 2,2'-methylenebis(4-tert-octyl-6-benzotriazolyl)phenol, and polyethylene glycol ester of 2-(2-hydroxy-3-tert-butyl-5-carboxyphenyl)benzotriazole; benzoates such as phenyl salicylate, resorcinol monobenzoate, 2,4-di-tert-butylphenyl 3,5-di-tert-butyl-4-hydroxybenzoate and hexadecyl 3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl α-cyano-β,β-diphenylacrylate and methyl 2-cyano-3-methyl-3-(p-methoxyphenyl)-acrylate.

The light stabilizers such as hindered amine compounds include hindered amines, e-g., 2,2,6,6-tetramethyl-4-piperidyl stearate, 1,2,2,6,6-pentamethyl-4-piperidyl stearate, 2,2,6,6-tetramethyl-4-piperidyl benzoate, bis( 2, 2,6,6-tetramethyl-4-piperidyl) sebacate, bis(1,2,2,6,6-pentamethyl-4-piperidyl) sebacate, tetrakis (2,6,6-tetramethyl-4-piperidyl)butanetetracarboxylate, tetrakis(1,2,2,6,6-pentamethyl-4-piperidyl) butanetetracarboxylate, bis(1,2,2,6,6-pentamethyl-4-piperidyl) di(tridecyl) 1,2,3,4-butanetetracarboxylate, bis(1,2,2,6,6-pentamethyl-4-piperidyl) 2-butyl-2-(3,5-di-tert-butyl-4-hydroxybenzyl)malonate, 1-(2-hydroxyethyl)-2,2,6,6-tetramethyl-4-piperidinol/ diethyl succinate polycondensate, 1,6-bis(2,2,6,6-tetraethyl-4-piperidylamino)hexane/dibromoethane polycondensate, 1,6-bis(2,2,6,6-tetramethyl-4-piperidylamino)hexane/ 2,4-dichloro-6-morpholino-s-triazine polycondensate, 1,6-bis(2,2,6,6-tetramethyl-4-piperidylamino)hexane/2, 4-dichloro-6-tert-octylamino-s-triazine polycondensate, 1,5,8,12-tetrakis[2,4-bis(N-butyl-N-(2,2,6,6-tetramethyl-4-piperidyl) amino)-s-triazin-6-yl]-1,5,8,12-tetrazadodecane, 1,5,8,12-tetrakis-[2,4-bis(N-butyl-N-(1,2,2,6,6-pentamethyl-4-piperidyl) amino)-s-triazin-6-yl]-1,5,8,12-tetrazadodecane, 1,6,11-tris[2,4-bis(N-butyl-N-(2,2,6,6-tetramethyl-4-piperidyl) amino)-s-triazin-6-ylamino]undecane and 1,6,11-tris[2,4-bis(N-butyl-N-(1,2,2,6,6-pentamethyl-4-piperidyl)-amino)-s-triazin-6-ylamino]undecane.

The crystalline synthetic resin composition of the present invention any contain, if necessary, a nonionic, cationic or anionic antistatic agent; another nucleating agent such as aluminum p-tert-butylbenzoate, dibenzylidenesorbitol or bis(4-methylbenzylidene)sorbitol; hydrotalcite; an aliphatic carboxylic acid salt of an alkaline earth metal; as well as a pigment, dye, filler, foaming agent, flame retardant, lubricant, processing assistant, etc.

The following examples will further illustrate the crystalline synthetic resin composition of the present invention, which by no means limit the invention.

EXAMPLE 1

A mixture of the following <recipe> was mixed on a mixer for 5 min and then extruded on an extruder at a temperature of 230° C. at a rotation rate of 20 rpm to form pellets. The pellets were molded into test pieces each having a thickness of 1 mm on an injection molding machine at 250° C. at a mold temperature of 60° C. The haze value (original) of the test pieces thus obtained was determined according to the method of ASTM D-1003-61. The haze value of the test piece was determined also after immersion in hot water at 80° C. for 36 h. The results are given in Table 1, wherein the term "comparative compound" refers to the compound given below.

| <Recipe> | parts by weight |
|---|---|
| ethylene/propylene random copolymer (ethylene content: 3 wt. %, MFR: 5.0 g/10 min) | 100 |
| tetrakis[methylene 3-(3,5-di-tert-butylphenylpropionate]methane | 0.1 |
| tris(2,4-di-tert-butylphenyl) phosphite | 0.1 |
| sample compound (see Table 1) | 0.1 |
| lithium laurate | 0.1 |
| comparative compound | | comparative compound structure: sodium salt of cyclic phosphate with two 2,4-di-tert-butylphenyl groups linked by CH$_2$, i.e., Na—O—P(=O)(O—Ar)(O—Ar) where Ar groups bear t-C$_4$H$_9$ substituents.

TABLE 1

| No. | Sample compound | Haze original % | Haze after immersion in hot water % |
|---|---|---|---|
| Comp. Ex. | | | |
| 1-1 | none | 32 | 35 |
| 1-2 | sodium 2,2'-methylenebis(4,6-di-tert-butylphenyl) phosphate (comp. compound) | 17 | 28 |
| 1-3 | Compound No. 1 (calcium laurate used instead of lithium laurate) | 24 | 31 |
| Ex. | | | |
| 1-1 | compound No. 1 | 5 | 7 |
| 1-2 | compound No. 2 | 8 | 10 |
| 1-3 | compound No. 3 | 6 | 9 |
| 1-4 | compound No. 4 | 5 | 8 |
| 1-5 | compound No. 5 | 5 | 8 |
| 1-6 | compound No. 6 | 6 | 8 |

EXAMPLE 2

A mixture of the following <recipe> was mixed on a mixer for 5 min and then extruded on an extruder at a temperature of 230° C. at a rotation rate of 20 rpm to form pellets. The pellets were molded into test pieces each having a thickness of 1 mm on an injection molding machine at 250° C. at a mold temperature of 60° C. The haze value of the test piece thus obtained was determined in the same manner as that of Example 1.

In addition, Izod impact strength at 20° C. was also determined according to ASTM D-256 (kg·cm/cm$^2$, hereinafter referred to merely as "impact strength") in Table 2. The results are given in Table 2.

| <Recipe> | parts by weight |
| --- | --- |
| crystalline ethylene/propylene random copolymer (ethylene content: 2.5 wt. %, MFR: 7.0 g/10 min) | 100 |
| 2,6-di-tert-butyl-4-methylphenol | 0.2 |
| stearyl β-(3,5-di-tert-butyl-4-hydroxyphenyl)propionate | 0.1 |
| hydrotalcite (DHT-4A; a product of Kyowa Chemical Industry Co., Ltd.) | 0.05 |
| bacic polyvalent metal salt of cyclic organophosphoric ester (compound No. 1) | 0.2 |
| sample compound (see Table 2) | see Table 2 |

TABLE 2

| No. | Sample Compound | Amount | Haze % | Impact Strength |
| --- | --- | --- | --- | --- |
| Comp. Ex. | | | | |
| 2-1 | none | — | 27 | 13.2 |
| 2-2 | calcium stearate | 0.10 | 28 | 13.1 |
| 2-3 | lithium stearate*[1] | 0.10 | 19 | 13.4 |
| 2-4 | lithium stearate*[2] | 0.10 | 35 | 8.5 |
| Ex. | | | | |
| 2-1 | sodium stearate | 0.10 | 6 | 14.9 |
| 2-2 | lithium stearate | 0.02 | 9 | 14.2 |
| 2-3 | lithium stearate | 0.04 | 9 | 14.5 |
| 2-4 | lithium stearate | 0.06 | 6 | 15.3 |
| 2-5 | lithium stearate | 0.10 | 5 | 15.4 |
| 2-6 | lithium stearate | 0.20 | 5 | 15.4 |
| 2-7 | lithium 12-hydroxy stearate | 0.10 | 5 | 15.3 |
| 2-8 | lithium laurate | 0.10 | 5 | 15.4 |
| 2-9 | lithium naphthenate | 0.10 | 6 | 15.3 |
| 2-10 | lithium benzoate | 0.10 | 7 | 14.8 |
| 2-11 | lithium lactate | 0.10 | 7 | 14.7 |
| 2-12 | lithium β-dodecylmercaptopropionate | 0.10 | 5 | 15.0 |
| 2-13 | lithium β-N-methyl-N-lauroylaminopropionate | 0.10 | 6 | 14.8 |
| 2-14 | lithium acetylacetonate | 0.10 | 6 | 15.0 |
| 2-15 | lithium laurylacetoacetate | 0.10 | 6 | 14.9 |

*[1]The comparative compound was used in place of compound No. 1.
*[2]No compound No. 1 was added.

EXAMPLE 3

A mixture of the following <recipe> was mixed on a mixer for 5 min and then extruded on an extruder at a temperature of 240° C. at a rotation rate of 20 rpm to form pellets. The pellets were molded into test pieces each having a thickness of 1 mm on an injection molding machine at 250° C. at a mold temperature of 60° C. The haze value of the test piece thus obtained was determined in the same manner as that of Example 1.

Test pieces having a thickness of 3.5 mm were prepared in the same manner as that described above, and irradiated with 5 Mrad γ-rays using cobalt 60 as the ray source. The Izod impact strength at 23° C. of each of the test pieces heated at 100° C. for 10 days after the irradiation with the γ-rays and the test pieces which had not been irradiated with the γ-rays was determined according to JIS K 7110. The results are given in Table 3 below.

| <Recipe> | parts by weight |
| --- | --- |
| propylene homopolymer (MFR: 6 g/10 min) | 100 |
| bis(2,6-di-tert-butyl-4-methylphenyl)pentaerythritol diphosphite | 0.05 |
| 1,6,11-tris[2,4-bis(N-butyl-N-(2,2,6,6-tetramethyl-4-piperidyl)-amino)-s-triazin-6-ylamino]undecane | 0.1 |
| sample compound (see Table 3) | 0.2 |
| lithium stearate | 0.15 |

TABLE 3

| | | | Izod impact strength | |
| --- | --- | --- | --- | --- |
| No. | Sample Compound | Haze value | before γ-ray irradn. (original) | after γ-ray irradn. (heated for 10 days) |
| Comp. Ex. | | | | |
| 3-1 | comparative compound | 33 | 3.6 | 2.5 |
| 3-2 | compound No. 1 (lithium hydroxide used instead of lithium stearate) | 30 | 3.8 | 3.1 |
| 3-3 | compound No. 1 (calcium stearate used instead of lithium stearate | 35 | 3.6 | 2.4 |
| Ex. | | | | |
| 3-1 | compound No. 1 | 23 | 4.7 | 4.4 |
| 3-2 | compound No. 2 | 26 | 4.3 | 4.0 |
| 3-3 | compound No. 3 | 24 | 4.5 | 4.2 |
| 3-4 | compound No. 4 | 23 | 4.6 | 4.2 |
| 3-5 | compound No. 5 | 23 | 4.6 | 4.3 |
| 3-6 | compound No. 6 | 24 | 4.5 | 4.3 |

EXAMPLE 4

100 parts by weight of polyethylene terephthalate having an intrinsic viscosity of 0.66 was mixed with 0.2 part by weight of sodium stearate and 0.15 part by weight of a sample compound (see Table 4). The resultant mixture was pelletized on a double-screw extruder. The pellets were fed into a differential calorimeter, and the temperature was elevated at a rate of 10° C./min to measure the crystallization temperature during temperature rise.

Further, the pellets were melted at 280° C. for 10 min and then the temperature was lowered at a rate of 5° C./min to measure the crystallization temperature during temperature fall. The ratio (H/W) of the height H of the endothermic peak during the temperature fall to the width W at a height of H/2 was determined.

The lower the crystallization temperature during temperature rise, the higher the degree of crystallization of the molding obtained by molding on a low-temperature mold. The higher the crystallization temperature during temperature fall and the higher the H/W, the higher the crystallization rate. The results are given in the following Table 4.

TABLE 4

| No. | Sample compound | Crystg. temp. during temp. rise °C. | Crystg. temp. during temp. fall °C. | H/W |
|---|---|---|---|---|
| Comp. Ex. | | | | |
| 4-1 | none | 138 | 191 | 7 |
| 4-2 | comparative compound | 123 | 204 | 13 |
| Ex. | | | | |
| 4-1 | Compound No. 1 | 114 | 221 | 26 |
| 4-2 | Compound No. 2 | 116 | 218 | 22 |
| 4-3 | Compound No. 3 | 115 | 219 | 23 |
| 4-4 | Compound No. 4 | 115 | 219 | 24 |
| 4-5 | Compound No. 5 | 114 | 220 | 25 |
| 4-6 | Compound No. 6 | 115 | 220 | 24 |

The above Tables 1 to 4 indicate the following facts:

When the alkali metal carboxylate or basic polyvalent metal salt of cyclic organophosohoric ester is used singly, the effect thereof is practically unsatisfactory and particularly the transparency improving effect thereof is insufficient, though the mechanical strengths and crystallization rate of the crystalline synthetic resin are improved to some extent. The improving effect is also insufficient when a combination of the alkaline earth metal carboxylate or alkali metal hydroxide with the basic polyvalent metal salt of cyclic organophosphoric ester or a combination of the alkali metal carboxylate with a metal salt of a cyclic organophosphoric ester other than the component (b) of the present invention is used.

On the contrary, the composition of the present invention containing the combination of the alkali metal salt compound with the basic polyvalent metal salt of cyclic organophosphoric ester exhibits further improved mechanical strengths and a remarkably improved transparency which has been insufficient in the prior art. Thus it will be apparent that the effect of the present invention is extremely specific.

What is claimed is:

1. A crystalline synthetic resin composition comprising 100 parts by weight of a crystalline synthetic resin selected from the group consisting of polyolefins, thermoplastic linear polyesters, polyphenylene sulfide, polycaprolactone and linear polyamides compounded with (a) 0.01 to 5 parts by weight of at least one selected from the group consisting of alkali metal carboxylates, alkali metal $\beta$-diketonates and alkali metal salts of $\beta$-ketoacetic esters and (b) 0.01 to 5 parts by weight of at least one of basic polyvalent metal salts of cyclic organophosphoric esters of the following formula (I):

$$\left[ \begin{array}{c} R_3 \\ \\ X-M-O-P \\ \\ R_3 \end{array} \begin{array}{c} O \\ \parallel \\ O \end{array} \begin{array}{c} R_2 \\ \\ CH-R_1 \\ \\ R^2 \end{array} \right]_2 \quad (I)$$

wherein $R_1$ represents a hydrogen atom or an alkyl group having 1 to 4 carbon atoms, $R_2$ and $R_3$ each represent a hydrogen atom or an alkyl group having 1 to 12 carbon atoms, M represents a group III or IV metal atom of the periodic table, and X represent OH—when M represents a group III metal atom of the periodic table and X represents O= or (OH)$_2$—when M represents a group IV metal atom of the periodic table.

2. The crystalline synthetic resin composition according to claim 1, wherein the component (a) is an alkali metal carboxylate.

3. The crystalline synthetic resin composition according to claim 2, wherein the alkali metal carboxylate is an alkali metal aliphatic carboxylate.

4. The crystalline synthetic resin composition according to claim 3, wherein the alkali metal is lithium.

5. The crystalline synthetic resin composition according to claim 1, wherein the component (b) is a compound of the formula (I) wherein M represents aluminum and X represents OH-.

6. The crystalline synthetic resin composition according to claim 1, wherein the crystalline synthetic resin is a polyolefin.

7. The crystalline synthetic resin composition according to claim 6, wherein the polyolefin is polypropylene.

8. The crystalline synthetic resin composition according to claim 6, wherein the polyolefin is an ethylene/propylene copolymer.

* * * * *